United States Patent [19]
Meszaros et al.

[11] Patent Number: 6,045,719
[45] Date of Patent: Apr. 4, 2000

[54] USE OF QUATERNIZED IMIDAZOLES AS CORROSION INHIBITORS FOR NON-FERROUS METALS, AND COOLANT COMPOSITIONS AND ANTIFREEZE CONCENTRATES COMPRISING THEM

[75] Inventors: Ladislaus Meszaros, Ludwigshafen; Michael Gillich, Mutterstadt; Klaus Pfitzner; Knut Oppenländer, both of Ludwigshafen; Wolfgang Günther, Mettenheim, all of Germany

[73] Assignee: BASF Aktiengesellschaft, Ludwigshafen, Germany

[21] Appl. No.: 09/125,038

[22] PCT Filed: Feb. 13, 1997

[86] PCT No.: PCT/EP97/00648

§ 371 Date: Aug. 11, 1998

§ 102(e) Date: Aug. 11, 1998

[87] PCT Pub. No.: WO97/30133

PCT Pub. Date: Aug. 21, 1997

[30] Foreign Application Priority Data

Feb. 15, 1996 [DE] Germany .............. 196 05 509

[51] Int. Cl.[7] .............. C09K 5/00; C23F 11/14
[52] U.S. Cl. .............. 252/77; 252/75; 252/394; 422/13; 422/16
[58] Field of Search .............. 252/77, 75, 394; 422/16, 13

[56] References Cited

U.S. PATENT DOCUMENTS

| | | | |
|---|---|---|---|
| 2,875,210 | 2/1959 | Bollenback et al. | 252/394 |
| 4,452,758 | 6/1984 | Wilson et al. | 422/15 |
| 4,622,158 | 11/1986 | Walsh | 252/49.3 |

FOREIGN PATENT DOCUMENTS

| | | |
|---|---|---|
| 0 229 440 | 7/1987 | European Pat. Off. . |
| 0 564 721 | 10/1993 | European Pat. Off. . |
| 2 193 095 | 2/1974 | France . |
| 2 733 511 | 4/1995 | France . |
| 4041173 | 6/1992 | Germany . |
| 61-37988 | 2/1986 | Japan . |

OTHER PUBLICATIONS

Chemical Abstracts, AN 80:133872, "Synthesis and homopolymerization of vinylimidazolium salts", Salamone et al, No Month Available 1973.

Derwent Publication Ltd., London. GB, & JP 06 157 471, Jun. 3, 1994.

*Primary Examiner*—Christine Skane
*Attorney, Agent, or Firm*—Oblon, Spivak, McClelland, Maier & Neustadt, P.C.

[57] ABSTRACT

Quaternized imidazoles I

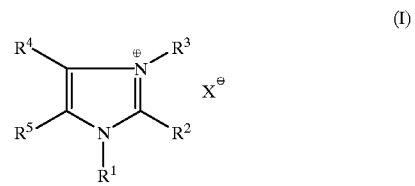

in which $R^1$ and $R^3$ independently of one another are saturated or unsaturated hydrocarbon radicals of 1–12 carbon atoms which can be substituted by oxygen-functional groups or interrupted by nonadjacent oxygens, $R^2$, $R^4$ and $R^5$ independently of one another are hydrogen or saturated or unsaturated hydrocarbon radicals of 1–12 carbon atoms which can be substituted by oxygen-functional groups or interrupted by nonadjacent oxygens, it being possible for $R^4$ and $R^5$, together with the corresponding imidazole carbons, to form a five- or six-membered ring, and $X^\ominus$ is an anion, are used as corrosion inhibitors in the corrosion protection of nonferrous metals, especially for car radiator protection.

15 Claims, No Drawings

USE OF QUATERNIZED IMIDAZOLES AS CORROSION INHIBITORS FOR NON-FERROUS METALS, AND COOLANT COMPOSITIONS AND ANTIFREEZE CONCENTRATES COMPRISING THEM

Use of quaternized imidazoles as corrosion inhibitors for non-ferrous metals, and coolant compositions and antifreeze concentrates comprising them The present invention relates to the use of specific quaternized imidazoles as corrosion inhibitors for preventing the corrosion of nonferrous metals. The invention also relates to antifreeze concentrates and to ready-to-use aqueous coolant compositions comprising these quaternized imidazoles, and to a method of treating aqueous liquids with these quaternized imidazoles in order to reduce the corrosion of nonferrous metals.

Antifreeze for the cooling circuits of internal-combustion engines, as in automobiles, generally contains an alkylene glycol, especially ethylene glycol or propylene glycol, as the principal component. For use in the cooling system these are diluted with water and are intended to provide not only for protection from frost but also for good heat dissipation. Alkylene glycol/water mixtures, however, are highly corrosive at the operating temperatures of internal-combustion engines, and therefore the various metals and their alloys present in the cooling system must be provided with sufficient protection against a wide variety of types of corrosion, such as pitting, crevice corrosion, erosion or cavitation. For use as corrosion inhibitors in such cooling systems the prior art already includes a multiplicity of individual chemicals.

As far as temperature stress on the heat transfer faces, pressure, flow rate and the selection of appropriate materials are concerned, the operating conditions in modern internal-combustion engines nowadays place very much greater demands on the anticorrosion capacity of the coolant than was previously the case. In addition to the known materials, such as copper, brass, soft solder, steel and gray cast iron, aluminum alloys are being used to an increasing extent. Consequently, more of the recent patent literature describes specific combinations of long-known active substances, each claimed to have its own specific spectrum of action.

For instance, EP-B 229 440 (1) describes the combination of the salt of an aliphatic monobasic $C_3$–$C_{16}$ acid, the salt of a dibasic $C_5$–$C_{16}$-hydrocarbon acid and a hydrocarbon-triazole as an effective inhibitor formulation in a liquid-alcoholic freezing-point reducer for protecting aluminum alloys against pitting. It is additionally possible to employ other customary inhibitors, such as alkali metal borate, silicate, benzoate, nitrate, nitrite or molybdate, and/ or a hydrocarbazole.

EP-A 564 721 (2) discloses antifreeze compositions, in particular for car radiator protection, which comprise a combination of the salt of an aliphatic monobasic $C_5$–$C_{16}$ acid, a hydrocarbon-triazole and imidazole as effective inhibitor formulation in a liquid-alcoholic freezing-point reducer. The imidazole concerned includes unsubstituted imidazole and also alkyl- and aryl-substituted imidazole.

A deficiency of the known inhibitor combinations is that, as far as nonferrous metal protection is concerned, they lose marks at elevated temperatures. For example, the hydrocarbon-triazoles which are employed predominantly in this context, for example benzotriazole and toluotriazole, lose their effectiveness above about 130° C.

It is an object of the present invention, therefore, to find substances which raise the high-temperature protection afforded to nonferrous metals by customary inhibitor systems without a drop in protection for the other metals, especially aluminum alloys.

We have found that this object is achieved by the extensive replacement, in customary inhibitor systems, of the hydrocarbon-triazoles, such as benzotriazole or toluotriazole, by quaternized imidazoles, resulting in a marked improvement in the protection afforded to nonferrous metals, especially copper, brass and bronze, under high temperature stress.

It has been found that quaternized imidazoles of the general formula I

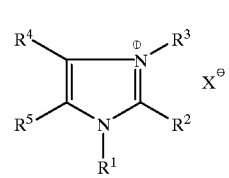

(I)

where $R^1$ and $R^3$ independently of one another are saturated or unsaturated hydrocarbon radicals of 1–12 carbon atoms which can be substituted by oxygen-functional groups or interrupted by nonadjacent oxygens, $R^2$, $R^4$ and $R^5$ independently of one another are hydrogen or saturated or unsaturated hydrocarbon radicals of 1–12 carbon atoms which can be substituted by oxygen-functional groups or interrupted by nonadjacent oxygens, it being possible for $R^4$ and $R^5$, together with the corresponding imidazole carbons, to form a five- or six-membered ring, and $X^\ominus$ is an anion, are generally suitable as corrosion inhibitors in connection with the corrosion protection of nonferrous metals, especially copper, brass and bronze.

Particularly suitable oxygen-functional groups for $R^1$ to $R^5$ are hydroxyl, carbonyl, carboxyl and $C_1$–$C_4$-alkoxycarbonyl. Depending on the size of $R^1$ to $R^5$ it is possible for each to carry 1–6, in particular 1–3, of such groups. Similarly, 1–6, especially 1–3, ether oxygens can be present per radical.

Preference is given in this context to quaternized imidazoles I where $R^1$ is $C_1$–$C_4$-alkyl, $C_2$–$C_4$-alkenyl, $C_2$–$C_4$-hydroxyalkyl, phenyl-$C_1$–$C_4$-alkyl, phenyl or tolyl, $R^2$ is hydrogen or $C_1$–$C_4$-alkyl, $R^3$ is $C_1$–$C_4$-alkyl or benzyl, $R^4$ and $R^5$ are hydrogen, $C_1$–$C_4$-alkyl or together are a benzo-fused ring, and $X^\ominus$ is a mono-$C_1$–$C_4$-alkyl sulfate anion, half the stoichiometric amount of sulfate or of hydrogen phosphate ($HPO_4^{2\ominus}$), dihydrogen phosphate ($H_2PO_4^\ominus$), a third of the stoichiometric amount of phosphate ($PO_4^{3\ominus}$), or nitrate, chloride or bromide.

Particularly preferred quaternized imidazoles I are 1-methyl-imidazole, 1-ethylimidazole, 1-(β-hydroxyethyl) imidazole, 1,2-di-methylimidazole, 1-phenylimidazole, benzimidazole and, in particular, N-vinylimidazole, which are quaternized with benzyl chloride, benzyl bromide, methyl chloride, methyl bromide, ethyl chloride, ethyl bromide, diethyl sulfate or, in particular, dimethyl sulfate.

The anions mentioned, where not obtained via the quaternizing agent, can also be obtained by customary anion exchange methods on the quaternized system. In the case of quaternization with dialkyl sulfates it is possible for one or two alkyl groups to be transferred, resulting in the anions $R^3OSO_3^\ominus$ or $SO_4^{2\ominus}$ (in half the stoichiometric amount).

For the present invention, very special interest attaches to N-vinylimidazole quaternized with dimethyl sulfate.

The present invention additionally relates to antifreeze concentrates based on alkylene glycols or derivatives thereof and comprising 0.0005–2% by weight, preferably 0.01–1% by weight, especially 0.05–0.5% by weight, based on the overall amount of concentrate, of one or more of the abovementioned quaternized imidazoles I.

The hydrocarbon-triazoles of unfavorable temperature stability, such as benzotriazole or toluotriazole, which are commonly present in such antifreeze compositions, can be largely or completely replaced by the quaternized imidazoles I described. Since under certain circumstances, however, advantages are possible in respect of the protective action for nonferrous metals, owing to synergistic effects between small amounts of hydrocarbon-triazoles and quaternized imidazoles I, a preferred embodiment of the present invention relates to novel antifreeze concentrates which additionally comprise up to 0.3% by weight, in particular 0.001–0.1% by weight, especially 0.005–0.05% by weight, based on the total amount of concentrate, of at least one hydrocarbon-triazole and/or hydrocarbon-thiazole.

Since in some cases it is also possible to find synergistic effects between the quaternized imidazoles I and nonquaternized imidazoles as described in (2), a further preferred embodiment of the present invention relates to novel antifreeze concentrates which additionally comprise 0.001–5% by weight, in particular 0.01–2% by weight, especially 0.05–1% by weight, based on the total amount of concentrate, of nonquaternized imidazole and/or at least one nonquaternized alkyl- or aryl-substituted imidazole, for example a 1-($C_1$–$C_4$-alkyl)imidazole or 1-phenylimidazole.

In addition, the novel antifreeze concentrates may also comprise all other customary inhibitor components for antifreeze formulations, including in particular:

up to 5% by weight, especially 0.05–3% by weight, based on the total amount of concentrate, of alkali metal borates, eg. sodium tetraborate (borax), and/or alkali metal phosphates, eg. disodium hydrogen phosphate or trisodium phosphate;

up to 5% by weight, especially 0.05%–4% by weight, based on the total amount of concentrate, of at least one aliphatic or aromatic dicarboxylic acid of 4–16 carbon atoms, in particular 8–12 carbon atoms, in the form of its alkali metal salts, ammonium salts or amine salts, eg. the disodium salts or dipotassium salts of suberic, azelaic, sebacic, undecanedioic, dodecanedioic, dicyclopentadienedicarboxylic, phthalic or terephthalic acid;

up to 5% by weight, especially 0.05%–4% by weight, based on the total amount of concentrate, of at least one aliphatic or aromatic monocarboxylic acid of 3–16 carbon atoms, in particular 5–12 carbon atoms, 7 carbons being the minimum for aromatic monocarboxylic acids, in the form of its alkali metal salts, ammonium salts or amine salts, eg. the sodium salts or potassium salts of pentanoic, hexanoic, octanoic, 2-ethylhexanoic, nonanoic, decanoic, undecanoic, dodecanoic, benzoic or methylbenzoic acid;

one or more corrosion inhibitors from the group consisting of alkali metal silicates, molybdates, nitrites and nitrates, and magnesium nitrate, each in amounts of up to 1% by weight, especially 0.05%–0.8% by weight, based on the total amount of concentrate; examples are sodium metasilicate, sodium nitrite, sodium nitrate and sodium molybdate.

When alkali metal silicates are also used, they are advantageously stabilized using customary organosilicophosphonates or organosilicosulfonates in customary amounts.

In addition to the abovementioned inhibitor components it is also possible, for example, to employ hydrocarbazoles in customary amounts.

The overall corrosion inhibitor component can be up to 15% by weight, in particular up to 10% by weight, of the total amount of concentrate, where the concentration of individual constituents can be up to 5% by weight.

The novel antifreeze concentrates can additionally comprise up to 1% by weight, in particular 0.01–0.5% by weight, based on the total amount of concentrate, of hard-water stabilizers based on polyacrylic acid, polymaleic acid, acrylic acid-maleic acid copolymers, polyvinylpyrrolidone, polyvinylimidazole, vinyl-pyrrolidone-vinylimidazole copolymers and/or copolymers of unsaturated carboxylic acids and olefins.

The pH of the novel antifreeze concentrates is commonly 6–11, preferably 7–9, in particular 7.1–7.3, and is generally established at the desired level by adding alkali metal hydroxide, ammonia or amines to the formulation; solid sodium hydroxide and potassium hydroxide, and aqueous solutions thereof, are particularly suitable for this purpose. Any aliphatic or aromatic mono- and/or dicarboxylic acids used are advantageously added directly as the corresponding alkali metal salts so as to establish the desired pH range automatically, but these carboxylic acids can also be added as the free acids, after which the formulation is neutralized with alkali metal hydroxide, ammonia or amines and the desired pH range is established.

Suitable liquid-alcoholic freezing-point reducers, which normally make up the major constituent (generally at least 80% by weight, in particular at least 90% by weight) of the novel antifreeze concentrates, are alkylene glycols or derivatives thereof, especially propylene glycol and, in particular, ethylene glycol. However, higher glycols and glycol ethers are also suitable, examples being diethylene glycol, dipropylene glycol and monoethers of glycols, such as the methyl, ethyl, propyl and butyl ethers of ethylene, propylene, diethylene and dipropylene glycols. It is also possible to use mixtures of said glycols and glycol ethers.

The present invention also relates to ready-to-use aqueous coolant compositions of reduced freezing point, especially for car radiator protection, which comprise water and 10–90% by weight, preferably 20–60% by weight, of the novel antifreeze concentrates.

The present invention relates, moreover, to a method of treating aqueous liquids comprising a water-soluble freezing-point reducer based on alkylene glycols or derivatives thereof in order to reduce the corrosion of nonferrous metals in contact with the aqueous liquids, which comprises admixing to the aqueous liquids an effective amount of one or more quaternized imidazoles I. For the corrosion-inhibiting imidazoles I, this amount is normally 0.0005–2% by weight, preferably 0.01–1% by weight, especially 0.05–0.5% by weight, based on the total amount of freezing-point reducer and all associated corrosion inhibitors and other additives.

EXAMPLES

The present invention is illustrated using Examples A, B, D and G of the invention and Comparison Examples C, E, F and X. Table 1 shows the composition of the inhibitor mixtures, in ethylene glycol, which are used to illustrate the invention. These anti-freeze concentrates were diluted with water and subjected to standard corrosion tests.

The results obtained in the ASTM D 1384 corrosion test (Table 2) first of all show clearly that the quaternary structure of the imidazoles constitutes the principle of action of the novel non-ferrous metal protector. Thus Examples C and D illustrate, in direct comparison between 1-methylimidazole and the same compound quaternized with dimethyl sulfate (DMS), the marked difference in the amount of material lost, for copper and brass.

Examples B and G also show clearly the good protective action of the quaternary structure, which is at least at the level of that afforded by, for example, benzotriazole (the hydrocarbon-triazole commonly used), as shown by Comparison Example X. Furthermore, the quaternized imidazoles also exhibit an at least equal protective action for other metals (in this case soft solder, steel, gray cast iron and cast aluminum) to that of benzotriazole.

The enhanced protective effect for nonferrous metals of the quaternized imidazoles I employed in accordance with the invention, in comparison with the hydrocarbon-triazoles which are commonly employed, becomes particularly evident when a test under elevated temperature stress is considered (Table 3). This is the MTU (German Engine and Turbine Union) hot chamber corrosion test, which is normally carried out using specimens of aluminum alloy. Examples A and B demonstrate the enhanced protective effect relative to Comparison Example X; also evident is the synergy between the quaternized imidazole I and small amounts of hydrocarbon-triazole, which is not so marked in the ASTM D 1384 corrosion test. Once again, the effect of quaternization is revealed when Examples A and B are compared with C and E.

The variables and conditions specified in the examples serve to illustrate the invention and do not constitute any restrictions.

TABLE 1

Antifreeze concentrate compositions [in % by weight]

|  | X | A | B | C | D | E | F | G |
|---|---|---|---|---|---|---|---|---|
| Sodium tetraborate (borax) | 1.00 | 1.00 | 1.00 | 1.00 | 1.00 | 1.00 | 1.00 | 1.00 |
| Sodium nitrate | 0.25 | 0.25 | 0.25 | 0.25 | 0.25 | 0.25 | 0.25 | 0.25 |
| Sodium hydroxide | *) | *) | *) | *) | *) | *) | *) | *) |
| 2-Ethylhexanoic acid | 2.00 | 2.00 | 2.00 | 2.00 | 2.00 | 2.00 | 2.00 | 2.00 |
| Sebacic acid | 1.20 | 1.20 | 1.20 | 1.20 | 1.20 | 1.20 | 1.20 | 1.20 |
| Sodium metasilicate, stabilized | 0.60 | 0.60 | 0.60 | 0.60 | 0.60 | 0.60 | 0.60 | 0.60 |
| Benzotriazole | 0.10 | 0.03 | — | — | — | — | — | — |
| 1-Vinylimidazole, quaternized with DMS | — | 0.10 | 0.10 | — | — | — | — | — |
| 1-Methylimidazole | — | — | — | 0.10 | — | — | — | — |
| 1-Methylimidazole, quaternized with DMS | — | — | — | — | 0.10 | — | — | — |
| Imidazole | — | — | — | — | — | 0.10 | — | — |
| 2-Ethylimidazole | — | — | — | — | — | — | 0.10 | — |
| 1-Ethylimidazole, quaternized with DMS | — | — | — | — | — | — | — | 0.10 |
| Ethylene glycol | rem. | rem. | rem. | rem. | rem. | rem. | rem. | rem. |
| (rem. = remainder to 100%) | | | | | | | | |

*)amount required to establish a pH of 7.2 in each case

TABLE 2

ASTM D 1384 glassware corrosion tests [weight changes in mg/cm²]

| Test specimen | X | A | B | C | D | E | F | G |
|---|---|---|---|---|---|---|---|---|
| Copper | +0.01 | −0.10 | +0.01 | −0.52 | ±0.00 | −0.80 | −1.14 | ±0.00 |
| Soft solder | +0.02 | −0.01 | ±0.00 | −0.03 | −0.01 | ±0.00 | −0.01 | ±0.00 |
| Brass | −0.01 | −0.05 | +0.01 | −0.47 | −0.01 | −0.50 | −0.93 | +0.01 |
| Steel | ±0.00 | ±0.00 | ±0.00 | −0.02 | ±0.00 | −0.01 | +0.01 | +0.01 |
| Gray cast iron | ±0.00 | +0.03 | +0.03 | +0.01 | +0.02 | +0.04 | +0.02 | +0.02 |
| Cast aluminum | −0.01 | ±0.00 | +0.02 | +0.04 | −0.09 | +0.02 | +0.10 | +0.02 |

TABLE 3

MTU hot chamber corrosion tests (modified)
[weight changes in mg/cm² (after pickling)]
Solution: 20% by volume distilled water
Sample temperature: 130° C.
Test duration: 50 h

| Test specimen | X | A | B | C | E |
|---|---|---|---|---|---|
| Electrolytic copper | −1.05 | −0.06 | −0.30 | −1.23 | −1.50 |

We claim:

1. A method of protecting nonferrous metals from corrosion, which comprises using as a corrosion inhibitor a quaternized imidazole of the formula I

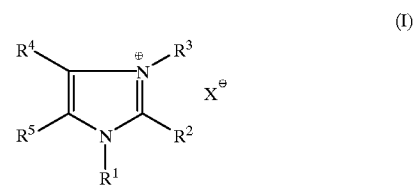

(I)

wherein $R^1$ and $R^3$ independently of one another are saturated or unsaturated hydrocarbon radicals of 1–12 carbon atoms which can be substituted by oxygen-functional groups selected from the group consisting of hydroxyl, carbonyl, carboxyl and $C_{1-4}$ alkoxycarbonyl, and mixtures thereof or interrupted by nonadjacent oxygens, $R^2$, $R^4$ and $R^5$ independently of one another are hydrogen or saturated or unsaturated hydrocarbon radicals of 1–12 carbon atoms which can be substituted by oxygen-functional groups or interrupted by nonadjacent oxygens, wherein $R^4$ and $R^5$, together with the corresponding imidazole carbons, optionally form a five- or six-membered ring, and $X^\ominus$ is an anion.

2. The method as claimed in claim 1, wherein:

$R^1$ is $C_1$–$C_4$-alkyl, $C_2$–$C_4$-alkenyl, $C_2$–$C_4$-hydroxyalkyl, phenyl-$C_1$–$C_4$-alkyl, phenyl or tolyl, $R^2$ is hydrogen or $C_1$–$C_4$-alkyl, $R^3$ is $C_1$–$C_4$-alkyl or benzyl, $R^4$ and $R^5$ are hydrogen, $C_1$–$C_4$-alkyl or together are a benzo-fused ring, and $X^\ominus$ is a mono-$C_1$–$C_4$-alkyl sulfate anion, dihydrogen phosphate, nitrate, chloride or bromide, half the stoichiometric amount of sulfate, half the stoichiometric amount of hydrogen phosphate, or a third of the stoichiometric amount of phosphate.

3. The method as claimed in claim 1, which comprises using N-vinylimidazole quaternized with dimethyl sulfate.

4. An antifreeze concentrate comprising alkylene glycols, or derivatives thereof, and 0.0005–2% by weight, based on the total amount of concentrate, of one or more quaternized imidazoles of the formula I

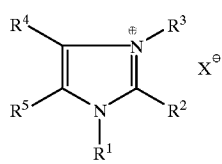
(I)

wherein $R^1$ and $R^3$ independently of one another are saturated or unsaturated hydrocarbon radicals of 1–12 carbon atoms which can be substituted by oxygen-functional groups selected from the group consisting of hydroxyl, carbonyl, carboxyl and $C_{1-4}$ alkoxycarbonyl, and mixtures thereof or interrupted by nonadjacent oxygens, $R^2$, $R^4$ and $R^5$ independently of one another are hydrogen or saturated or unsaturated hydrocarbon radicals of 1–12 carbon atoms which can be substituted by oxygen-functional groups or interrupted by nonadjacent oxygens, wherein $R^4$ and $R^5$, together with the corresponding imidazole carbons, optionally form a five- or six-membered ring, and $X^\ominus$ is an anion.

5. The antifreeze concentrate as claimed in claim 4, which additionally comprises up to 0.3% by weight, based on the total amount of concentrate, of at least one hydrocarbon-triazole and/or hydrocarbon-thiazole.

6. The antifreeze concentrate as claimed in claim 4, additionally comprising 0.001–5% by weight, based on the total amount of concentrate, of nonquaternized imidazole and/or at least one nonquaternized alkyl- or aryl-substituted imidazole.

7. The antifreeze concentrate as claimed in claim 4, additionally comprising up to 5% by weight, based on the total amount of concentrate, of alkali metal borates and/or alkali metal phosphates.

8. The antifreeze concentrate as claimed in claim 4, additionally comprising up to 5% by weight, based on the total amount of concentrate, of at least one aliphatic or aromatic dicarboxylic acid of 4–16 carbon atoms in the form of its alkali metal salts, ammonium salts or amine salts.

9. The antifreeze concentrate as claimed in claim 4, additionally comprising up to 5% by weight, based on the total amount of concentrate, of at least one aliphatic or aromatic monocarboxylic acid of 3–16 carbon atoms in the form of its alkali metal salts, ammonium salts or amine salts.

10. The antifreeze concentrate as claimed in claim 4, additionally comprising one or more additional corrosion inhibitors selected from the group consisting of alkali metal silicates, molybdates, nitrites, nitrates and magnesium nitrate in amounts of in each case up to 1% by weight, based on the total amount of concentrate.

11. The antifreeze concentrate as claimed in claim 4, additionally comprising up to 1% by weight, based on the total amount of concentrate, of hard-water stabilizers based on polyacrylic acid, polymaleic acid, acrylic acid-maleic acid copolymers, polyvinylpyrrolidone, polyvinylimidazole, vinylpyrrolidone-vinylimidazole copolymers and/or copolymers of unsaturated carboxylic acids and olefins.

12. The antifreeze concentrate as claimed in claim 4, which has a pH of 6–11.

13. The antifreeze concentrate as claimed in claim 4, wherein the alkylene glycols comprise ethylene glycol.

14. A ready-to-use aqueous coolant composition of reduced freezing point, which comprises water and 10–90% by weight of an antifreeze concentrate as claimed in claim 4.

15. A method of treating aqueous liquids, which comprises admixing to the aqueous liquids an amount of one or more quaternized imidazoles I of the formula I to reduce the corrosion of nonferrous metals in contact with the aqueous liquids

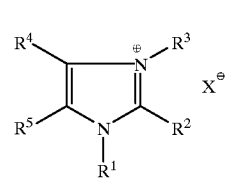
(I)

wherein $R^1$ and $R^3$ independently of one another are saturated or unsaturated hydrocarbon radicals of 1–12 carbon atoms which can be substituted by oxygen-functional groups selected from the group consisting of hydroxyl, carbonyl, carboxyl and $C_{1-4}$ alkoxycarbonyl, and mixtures thereof or interrupted by nonadjacent oxygens, $R^2$, $R^4$ and $R^5$ independently of one another are hydrogen or saturated or unsaturated hydrocarbon radicals of 1–12 carbon atoms which can be substituted by oxygen-functional groups or interrupted by nonadjacent oxygens, wherein $R^4$ and $R^5$, together with the corresponding imidazole carbons, optionally form a five- or six-membered ring, and $X^\ominus$ is an anion, wherein the aqueous liquids comprise a water soluble freezing point reducer based on alkylene glycols or derivatives thereof.

* * * * *